J. W. KURFEES.
VENTILATOR AND DEFLECTOR FOR CAR WINDOWS, DOORS, AND THE LIKE.
APPLICATION FILED NOV. 10, 1914.

1,177,190.  Patented Mar. 28, 1916.

Witnesses  
C. F. Rudolph  
John J. McCarty

Inventor  
John W. Kurfees,  
By Victor J. Evans  
Attorney

UNITED STATES PATENT OFFICE.

JOHN WESLEY KURFEES, OF GERMANTON, NORTH CAROLINA.

VENTILATOR AND DEFLECTOR FOR CAR WINDOWS, DOORS, AND THE LIKE.

1,177,190.

Specification of Letters Patent.

Patented Mar. 28, 1916.

Application filed November 10, 1914. Serial No. 871,365.

*To all whom it may concern:*

Be it known that I, JOHN W. KURFEES, a citizen of the United States of America, residing at Germanton, in the county of Stokes and State of North Carolina, have invented new and useful Improvements in Ventilators and Deflectors for Car Windows, Doors, and the like, of which the following is a specification.

This invention relates to improvements in ventilators and deflectors for car windows and doors whereby the interior of the car may be ventilated and cinders, dust and other foreign matter deflected and prevented from entering the car by way of the window opening while the car is in motion.

In carrying out the present invention, it is my purpose to improve and simplify the general construction of ventilators and deflectors of the class described and to provide a device which may be swung from one position to another according to the direction of travel of the car and held in the adjusted position securely and effectively so as to deflect the cinders, dirt and other foreign matter and enable the interior of the car to be thoroughly ventilated.

It is also my purpose to provide a device of the type set forth which will be held in adjusted position under the action of gravity and which may be readily and conveniently swung from one position to the other so that the device may be rendered serviceable when the car is traveling in either direction.

With the above and other objects in view, the invention consists in the construction, combination and arrangement of parts hereinafter set forth in and falling within the scope of the claim.

Figure 1:
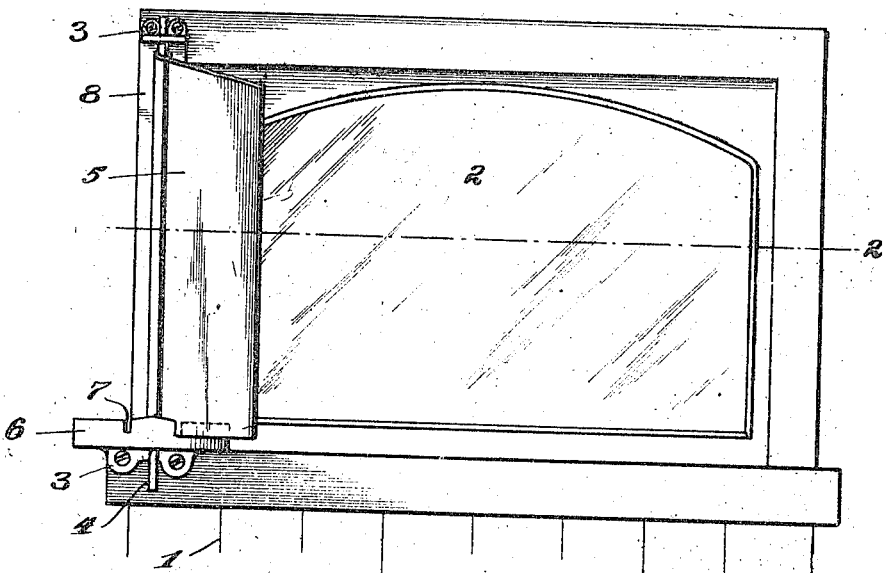
Figure 2:
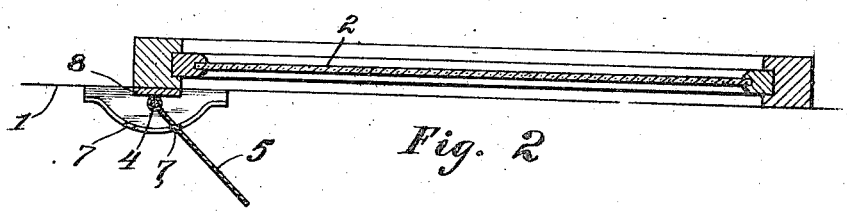
Figure 3:
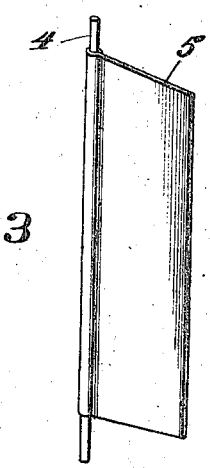
Figure 4:
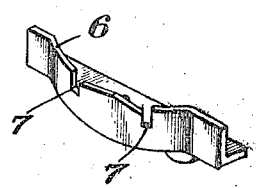

In the accompanying drawing; Figure 1 is a fragmentary side elevation of a car body having a window opening therein and equipped with a deflector constructed in accordance with the present invention. Fig. 2 is a horizontal sectional view on the line 2—2 of Fig. 1. Fig. 3 is a perspective view of the deflector removed from the car. Fig. 4 is a similar view of the segment for holding the deflector in adjusted position.

Referring now to the drawing in detail, 1 designates the side wall of a car body, such wall having a window opening 2 formed therein. Suitably secured to the outer side of the wall 1 immediately in front of the window opening 2 are vertically alining bearing brackets 3 spaced apart a distance slightly greater than the height of the window and journaled within the bearings 3 is a vertical shaft 4 capable of vertical and rotatable movements within the bearings. Fixed to the shaft 4 between the bearings and of a height equal to the similar dimension of the window opening is a deflector plate 5, and formed on the lower bearing brackets 3 is a horizontally disposed segmental flange 6 disposed concentrically of the shaft 4 and having the upper edge thereof formed with notches 7 appropriately spaced apart and adapted to receive the lower edge of the deflector to hold the latter in adjusted position succeeding the movements thereof. The upper edge of the flange 6 between the adjacent notches 7 inclines downwardly toward the respective notches from a point centrally of the distance between the notches so that the lower edge of the deflector plate will gravitate into one or the other of the notches after such plate has moved over the upper edge of the segmental flange past the center of the distance between the notches, while the ends of the flange 6 are outturned and lie in planes substantially parallel with the side wall of the car and are spaced apart from the side of the car as clearly illustrated in Fig. 2 of the drawing.

In practice, to adjust the deflector plate the latter is elevated to disengage the lower edge thereof from the adjacent notch 7 and in the upward movement of the deflector plate similar motion is imparted to the shaft 4. After the deflector plate has been disengaged from the notch 7 in the segmental flange 6, such plate is swung over the upper edge of the bar toward the other notch and as the lower edge of the deflector plate passes a point centrally of the distance between the notches, such edge of the deflector slides down the inclined edge portion of the segmental flange under the action of gravity and drops into the adjacent notch 7. Thus, the deflector plate is locked in adjusted position.

When it is desired to hold the deflector plate 5 against the side of the car in an out of the way position, such plate is elevated so that the lower end edge thereof will disengage the particular notch 7 and the plate swung toward the side wall of the car into a position substantially parallel with the car wall. The plate is now released and the lower edge thereof engages behind the adjacent end of the segmental bar between such end of the bar and the side of the car. Thus, the deflector plate is securely held in an out of the way position. It will be noted that the deflector plate may be swung in either direction and held against the side of the car by either end of the segmental bar.

It will be noted that the lower bearing bracket acts as a baffle to prevent the cinders and other foreign matter from being drawn down the deflector plate and under the lower edge thereof and serve as a connection between the segmental bar and the car whereby the bar is held in proper position.

Although I have shown and described the deflector plate as mounted on a shaft, it is conceivable that the deflector plate may be formed with axially alining trunnions or pintles in lieu of the shaft. It will be observed that the spaces between the outturned ends of the flange 6 and the side wall of the car are of greater depth than the notches 7 so that when the deflector plate is disposed in an out of the way position, the lower bracket will act to support the deflector plate and relieve the bearings of the plate of the weight of the latter.

From the foregoing description taken in connection with the accompanying drawing, the construction, mode of operation and manner of employing my improved deflector plate will be readily apparent.

It will be seen that I have provided a deflector plate whereby cinders and the like may be prevented from entering the car through the window opening and whereby the interior of the car may be thoroughly and efficiently ventilated, while the deflector may be swung at any desired angle relatively to the side wall of the car and maintained at such angle.

I claim:

The combination with a car body having a window opening therein, of vertically alining bearing brackets secured to the car body at one side of the window opening and disposed adjacent to the top and bottom of said opening respectively, a deflector plate arranged at one side of the window opening and having the upper and lower ends thereof provided with trunnions journaled in said bearing brackets respectively, a segmental flange formed on the lower bearing bracket and having the upper edge thereof formed with notches adapted to receive the lower edge of the deflector to hold the latter in adjusted position and having the ends thereof outturned and spaced apart from the adjacent side of the car and lying parallel with the side of the car and adapted to receive the lower end edge of the deflector to hold the latter against the side wall of the car in an out of the way position, the edge of said flange between the adjacent notches being inclined downwardly toward the respective notches from a point centrally of the distance between the notches to guide the deflector into the notches and facilitating the seating thereof within the notches, the spaces between the outturned ends of said flange being of greater depth than said notches to support the deflector plate when the latter is in an out of the way position and relieve the bearings of the deflector plate of the weight of the plate.

In testimony whereof I affix my signature in presence of two witnesses.

JOHN WESLEY KURFEES.

Witnesses:
WATSON JOYCE,
T. C. CREVAN.